UNITED STATES PATENT OFFICE 2,394,432

COMPOSITION OF MATTER AND METHOD OF MAKING SAME

Melvin De Groote, University City, and Bernhard Keiser, Webster Groves, Mo., assignors to Petrolite Corporation, Ltd., Wilmington, Del., a corporation of Delaware No Drawing. Original application June 26, 1944, Serial No. 542,235. Divided and this application February 23, 1945, Serial No. 579,500

6 Claims. (Cl. 260—404)

This invention relates to a new chemical product or composition of matter, our present application being a division of our co-pending application Serial No. 542,235, filed June 26, 1944.

The main object of our invention is to provide a new chemical compound or product that is particularly adapted for use as a demulsifier for crude oil emulsions, but which is also capable of various other uses.

Another object of our invention is to provide a practicable method for manufacturing said new chemical product or compound.

The new material herein described, particularly when employed as a demulsifier, consists of sub-resinous reaction products derived by reaction between (A) A polybasic carboxy acid fractional ester having (a) an unreacted carboxyl radical; and (b) a detergent-forming monocarboxy acid radical having at least 8 and not more than 32 carbon atoms; said detergent-forming acid radical being an integral part of a detergent-forming acid compound consisting of acids, monohydric alcohol esters and polyhydric alcohol esters; and (B) A basic esterified amino-alcohol of the formula:

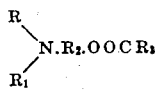

in which R is a monovalent radical free from ether linkages and having at least 8 carbon atoms and not more than 32 carbon atoms and being a member of the class consisting of aliphatic hydrocarbon radicals, alicyclic hydrocarbon radicals, and aralkyl hydrocarbon radicals; $R_2$ is a divalent radical having less than 16 carbon atoms and not more than 3 ether linkages and being a member of the class consisting of alkylene radicals, hydroxyalkylene radicals, alkyleneoxy radicals, hydroxyalkyleneoxy radicals, polyglycol and hydroxy polyglycol radicals, in which any alkylene radicals present are selected from the group consisting of ethylene, propylene, butylene, and methylbutylene; and $R_1$ is a monovalent radical and a member of the class consisting of aliphatic hydrocarbon radicals, alicyclic hydrocarbon radicals and aralkyl hydrocarbon radicals having not more than 32 carbon atoms, and the radical $HOR_2$, wherein $R_2$ has its prior significance; $R_3CO$ is an acyl radical of a low molal monocarboxy acid having less than 8 carbon atoms; with the added porviso that at least one of the three radicals $R_1$, $R_2$ and $R_3$ shall have present an alcoholic hydroxy radical.

The amino nitrogen atom must be free from directly linked acyl radicals or aryl radicals. Stated another way, the nitrogen atoms must be a basic amino nitrogen atom. See "Textbook of Organic Chemistry," Richter, 2nd Edition, page 253.

Amines of the kind contemplated and used as reactants in producing the compounds herein described, are produced in various manners. They may be produced from naphthenic acids, resin acids, fatty acids, or oxidied petroleum acids, or the like, by converting the acid into the ester, preferably the ethyl ester, or the like, and then converting the ester into the alcohol. Such alcohols, derived from various fatty acids, naphthenic acids, oxidized petroleum acids, resin acids, and the like, are available commercially and are employed in the manufacture of wetting agents, or the like, by sulfating or sulfonating such alcohols. Such high molal alcohols can be converted into the chlorides, and the chlorides reacted with ammonia or a primary or secondary amine to give amines of the type herein contemplated. If derived from higher fatty acids, such as stearic acid, the hydrocarbon chain is simply an alkyl radical. Naturally, if derived from an unsaturated fatty acid, such as oleic acid, the radical would represent an unsaturated hydrocarbon radical. If derived from ricinoleic acid or some other hydroxy acid, such as hydroxystearic acid, such amines include a hydroxylated hydrocarbon radical.

In actual practice amines of the kind herein contemplated as reactants, can be obtained in various ways.

In view of what has been said, it will be noted that the group introduced into the amine and derived at least hypothetically from an acid, is really the carbon atom chain radical of the acyl group of the acid or hypothetical acid, along with what was at least hypothetically the carbonyl carbon atom. For the sake of convenience, this radical will be referred to as a hydrocarbon radical; and it is intended to include derivatives in which a hydrogen atom or a small number of the hydrogen atoms have been replaced by the hydroxyl radical; for instance, the hydroxy hydrocarbon radical which would be supplied by ricinoleic acid, hydroxystearic acid, dihydroxystearic acid, or the like. In the present instance such usage seems eminently correct, in that the hydrocarbon radical supplies the hydrophobe portion of the amine, and this hydrophobe portion is not changed markedly by the presence of one or two hydroxyl groups, as are present in the case of ricinoleic acid, hydroxystearic acid, or the like; and such hydroxyl groups are essentially non-functional, in that they are not necessarily relied upon to supply points of chemical activity, as far as the herein contemplated compounds are concerned. They may slightly decrease the hydrophobe character of the radical to some degree; but this cannot be significant, and can be appreciated by reference to ricinoleic acid. Since the carbon atom chain supplied to the amine by means of ricinoleic acid has 18 carbon atoms, it would appear relatively immaterial whether there was present one hydroxyl group or not. Thus, it is to be borne in mind that the use in the hereto appended claims of the word "hydrocarbon" is intended to include the hydroxy-hydrocarbon type of the kind in which the hydroxyl group does not materially reduce the hydrophobe character of the hydrocarbon group, as, for example, the group or radical which would be obtained from ricinoleic acid.

In addition to synthetic carboxy acids obtained by the oxidation of paraffins, or the like, there is the somewhat analogous class obtained by treating carbon dioxide or carbon monoxide in the presence of hydrogen or an olefine, with steam, or by causing a metallic alkoxide, or a halogenated hydrocarbon to react with chloracetic acid, or with potassium cyanide, and saponifying the product thus obtained. Such products or mixtures thereof, having at least 8 and not more than 32 carbon atoms and having at least one carboxy group or the equivalent thereof, are as suitable for use as the conventional detergent-forming monocarboxy acids, and another analogous class equally suitable, is the mixture of carboxylic acids obtained by the alkali treatment of alcohols of higher molecular weight formed in the catalytic hydrogenation of carbon monoxide. The synthetic carboxy acids so obtained can be converted into high molal amines by the same procedure as employed for the conversion of other carboxy acids.

The patents previously referred to indicate a large number of suitable amines which are the type previously specified. For the sake of brevity, reference will be made only to certain primary amines. Obviously, secondary or tertiary amines could be derived from such primary amines by introducing alkyl groups having less than 8 carbon atoms, such as methyl, ethyl, propyl, butyl groups and the like; or one might introduce radicals in which the carbon atom chain was interrupted at least once by oxygen, as, for example, radicals derived by reacting an amine with compounds, such as $C_2H_5OC_2H_4Cl$ or $OHC_2H_4OC_2H_4Cl$. An aralkyl group, such as a benzyl group, might be introduced, or an alicyclic group, such as a cyclohexyl group.

The primary amines which may be used as such or converted into secondary amines, include the following: Octadecenylamine, cetylamine, stearylamine, oleoamine, ricinoleoamine, amines derived from naphthenic acids, amines derived from octadecadiene 9,11-acid-1, octadecylamine, amines derived from mixed unsaturated fatty acids such as soyabean fatty acids, cottonseed oil fatty acids, linseed oil fatty acids, heptadecylamine, hexadecylamine, dodecylamine, decylamine, etc.

Having obtained amines of the kind described, such amines are treated with an oxyalkylating agent, preferably ethylene oxide. Other oxyalkylating agents may be used. As typical examples of applicable compounds may be mentioned epichlorhydrin, glycide alcohol, ethylene oxide, propylene oxide, butene-2 oxide, butene-1 oxide, isobutylene oxide, butadiene oxide, butadiene dioxide, chloroprene oxide, isoprene oxide, decene oxide, styrene oxide, cyclohexylene oxide, cyclopentene oxide, etc.

It is to be noted that the same oxyethylation agent need not be employed throughout the entire oxyethylation process. For instance, the secondary amine, dioctylamine might be reacted with one mole of ethylene oxide, and two moles of propylene oxide, and such compound might then be treated with one mole of glycide and then with 2 or 4 moles of ethylene oxide. It would be equally feasible to use 2 moles of ethylene oxide and then one mole of glycide. This same procedure could be applied just as effectively to primary amines. Its special significance is as follows: If a secondary amine indicated by

is treated with 2 moles of ethylene oxide to give

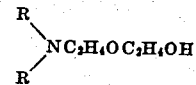

such product could then be treated with one mole of glycide to give a diol group, as follows:

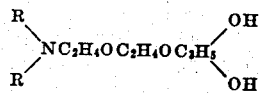

Such product meets the requirement that, after being reacted with a low molal monocarboxy acid, there is still present an available hydroxy radical for further reaction, as is required in the herein described procedure.

As will be indicated hereafter, the low molal acid which reacts with an alcoholic hydroxyl group, may also in turn contain a reactive hydroxyl radical, as in the instance of lactic acid or hydroxyacetic acid or the like.

For instance, reference is made to U. S. Patent No. 2,174,762, dated October 3, 1939, to Schuette, et al. Said patent is concerned with oxyethylation of amines to a degree sufficient to produce water solubility. In the present instance the number of recurring ether linkages in any single chain is preferably limited to 3 and water solubility may or may not occur. In other words, an oxyethylated high molal amine which is water-insoluble may serve as an intermediate reactant.

See also U. S. Patent No. 2,195,194, dated March 26, 1940, to Ulrich et al. As to methods which can be readily adapted for the oxyalkylation of high molal amines, as herein contemplated, see U. S. Patent No. 2,275,470, dated March 10, 1942, to Ruark, and U. S. Patent No. 2,337,004, dated December 14, 1943, to Schwoegler.

For convenience, attention is momentarily directed to the formula previously presented, to wit:

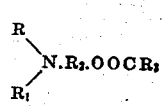

Since available low molal hydroxy acids are comparatively few, for instance, lactic acid, hydroxyacetic acid, etc., and since amines are derived from hydroxystearic acid, ricinoleic acid, etc., are not as readily available as other amines, it is obvious that, for most instances, the hydroxyl radical is part of the radical $R_1$ or $R_2$.

$R_1$ can readily represent a hydroxyethyl radical, a hydroxypropyl radical, etc. $R_2$ can readily contain a hydroxyl radical available for esterification, if the compound is obtained by the use of glycide or the like, all of which is illustrated by suitable formulae subsequently.

The following reactants are included purely by way of illustration, and the description is substantially that appearing in the indicated patents.

HIGH MOLAL AMINO-POLYGLYCOL

Example 1

One molecular proportion of dodecylamine is caused to react with 2 molecular proportions of epichlorhydrin which are added to the reaction mixture in small portions, 2 molecular proportions of propylene oxide then being brought into reaction at zero centigrade in the presence of 0.5% of sodium ethylate. The reaction can also be conducted conveniently, if suitable caution is employed and at the same temperature, or slightly higher temperature, by using glycide instead of the epichlorhydrin. This has the advantage that no hydrochloric acid is liberated to form a salt.

HIGH MOLAL AMINO-POLYGLYCOL

Example 2

One molecular proportion of cetylamine is heated in an autoclave under pressure at about 150° C. with four molecular proportions of propylene oxide and then with two molecular proportions of ethylene oxide. (See Examples 1 and 2 of aforementioned U. S. Patent No. 2,174,762.)

HIGH MOLAL AMINO-POLYGLYCOL

Example 3

A mixture of dicetyl- and dioctadecylethanolamine polyethylene glycol is obtained by the action of 3 molecular proportions of ethylene oxide on about 1 molecular proportion of a technical mixture of dicetylamine and dioctadecylamine. (See Example 1 of aforementioned U. S. Patent No. 2,195,194.) Such product is then reacted further with 1 mole of glycide.

HIGH MOLAL AMINO-POLYGLYCOL

Example 4

A mixture of 150 parts of N-stearyl-B,B',B''-trihydroxy-tert-butylamine with 45 parts of ethylene oxide (2.65 molecular equivalents) is heated in a closed vessel by raising the temperature to 120° C. uniformly during 5 hours, and then keeping at this temperature until the internal pressure falls to zero. (See U. S. Patent No. 2,091,105, dated August 24, 1937, to Piggott.)

HIGH MOLAL AMINO-POLYGLYCOL

Example 5

One pound mole of octadecylamine is reacted with 8 moles of ethylene oxide in the manner described under Example 1 in British Patent No. 380,851 to I. G. Farbenindustrie, A.-G., dated July 29, 1932. Attention is also directed to said patent insofar that it enumerates other high molal basic amines suitable for oxyalkylation.

Having obtained suitable monohydroxylated, or preferably, polyhydroxylated high molal aminopolyglycols or the equivalent, of the kind previously described, such products are subjected to esterification with low molal carboxy acids having 7 carbon atoms or less, in such predetermined ratios that there is present at least one alcoholic hydroxyl for subsequent esterification reactions. Monohydroxylated compounds require the use of a hydroxylated low molal carboxy acid.

Some of such acids have been previously described in characterizing the acyl radical $R_3CO$. Additional examples of the hydroxylated type have been mentioned. Other suitable acids include furoic and unsaturated acids, such as acrylic, crotonic, tiglic, etc.

The esterification reactions are conducted in the usual manner. In such instances where there are two polyglycol radicals present, one may introduce a low molal acyl radical as a substituent for each terminal hydrogen atom. It is our preference to select low molal acids having boiling points between approximately 150° and 220° C. The reaction can be conducted employing a considerable excess of such low molal acids and refluxing at the boiling point of such acids for approximately 5 to 15 hours. The reaction can also be conducted by means of an obvious equivalent such as an anhydride or other suitable derivative.

In the instance of acids having boiling points in excess of 175° C., for instance, normal caproic acid, it is our preference to add a stoichiometric equivalent and conduct the reaction until the amount of water eliminated is equal to, or almost equal to, the theoretical yield. Hydroxyacetic acid may be employed in the same manner.

In the following examples, reference is made to the use of certain low molal acids. Actually, the esterification reaction can be accelerated by the use of the anhydride, i. e., using one mole of the anhydride to replace 2 moles of acid, except in such instance where there is no objection to excess acid, and where the excess acid or excess anhydride is subsequently removed, one may replace each mole of acid by one mole of anhydride. Particular reference is concerned with the use of acetic anhydride, propionic anhydride, n-butyric anhydride, isobutyric anhydride, n-valeric anhydride, n-caproic anhydride, and particularly the last five, where the boiling points of the anhydrides vary from 169°. C to 242° C. When the corresponding acid is formed, such acid may serve as a reactant in the esterification reaction, or can be removed by vacuum distillation. Reference has been made to the acids only, because they are more generally available, but where the acyl chloride is available, the anhydride can be obtained from the acyl chlorides and the salt, or by other suitable means.

It has been pointed out that the herein contemplated amines used as reactants are basic in character. Thus, the initial reaction between the amine and the low molal carboxy acid results in salt formation. The esterification reaction involves the elimination of water from the salt. However, the esterified amine herein contemplated is still basic in character and combines with acids, particularly inorganic acids, to form salts. Reference to the amines includes the anhydro base, the hydrated base, i. e., the ammonium form, or any suitable salt, including salts of the various low molal carboxy acids hereinbefore contemplated as reactants.

Attention is again directed to the fact that there must be a hydroxyl radical left for subsequent reaction with phthalic anhydride, or its equivalent. If all hydroxyl radicals attached to the amino compound are eliminated, then the low molal acid must contain a hydroxyl group. A mixture of low molal acids such as caproic and hydroxyacetic may be used.

HYDROXYLATED MONOCARBOXY ESTER OF HIGH MOLAL AMINO-POLYGLYCOL

Example 1

1 pound mole of the product described under the heading "High molal amino-polyglycol, Example 3" is heated with 1 pound mole of isobutyric acid for approximately 8 to 18 hours at 150–154° C. The esterification is conducted by means of a hot condenser, that is, a condenser with the temperature regulated so as to be maintained at approximately 105° C. to 112.5° C. Such arrangement permits the elimination of much, if not all, of the water of esterification, but condenses and returns substantially all of the unreacted butyric acid for further reaction. The progress of the esterification reaction can be followed by the use of a second trap condenser to retain and measure the water of reaction. Such water should be titrated for determination of any acid which may have distilled over. At the end of such esterification period the residual unreacted butyric acid is eliminated by distillation, and if preferred, vacuum distillation may be employed. The amount of base required for saponification of the ester is, of course, a means of measuring the degree of esterification. Saponification reliberates the butyric acid, both from the salt form and the ester form. The product shows excellent solubility in dilute acetic acid or dilute mineral acid. The product derived from commercial raw materials is an amber-colored, viscous or sticky compound at ordinary room temperature, and if contaminated by the presence of metallic iron or the like, may show even a darker appearance. The inorganic salt forms are more solid in nature than the anhydro base. Such appearance is typical of the entire class of intermediate materials herein described.

HYDROXYLATED MONOCARBOXY ESTER OF HIGH MOLAL AMINO-POLYGLYCOL

Example 2

The high molal amino-polyglycol described under the heading of Example 1 is substituted for the high molal amino-polyglycol used in the preceding example.

HYDROXYLATED MONOCARBOXY ESTER OF HIGH MOLAL AMINO-POLYGLYCOL

Example 3

The same procedure is followed as in the preceding example, except that a product of the kind described under the heading "High molal amino-polyglycol, Example 2" is substituted for the amino-polyglycol employed in the previous example.

HYDROXYLATED MONOCARBOXY ESTER OF HIGH MOLAL AMINO-POLYGLYCOL

Example 4

Esterification is conducted by means of an acid having a substantially higher boiling point, such as normal caproic acid. One may use more than 1 mole of acid, provided there are present at least 3 hydroxyl radicals per mole of amino-polyglycol. The temperature of esterification is approximately 175°–195° C., and the condenser employed is a cold condenser with suitable arrangement to trap the water of esterification as formed, and also return any unreacted acid for further reaction. (Such arrangement is suitable where the acid is volatile and water-insoluble.) There is no difficulty in regard to the loss of the low molal acid, because, although it is volatile at the indicated temperature, yet it is readily condensable. Thus, as specific procedure illustrating the present example, one may use 1 mole of amino-polyglycol, Example 3, preceding, and 1 mole of caproic acid.

HYDROXYLATED MONOCARBOXY ESTER OF HIGH MOLAL AMINO-POLYGLYCOL

Example 5

The same procedure is employed as in the previous example, except that anhydrous hydroxyacetic acid is employed instead of caporic acid.

Previous reference has been made to high molal amino-polyglycols as reactants, for the reason that it is our preference to employ products in which there is at least one ether linkage obtained by the use of 2 or more moles of ethylene oxide per aminohydroxy atom. If desired, however, one may employ a single mole of the oxyethylating agent, such as ethylene oxide, for each available aminohydrogen atom. In such event, the product obtained is not a polyglycol, but an aminoalcohol, insofar that there is a single alkylene radical present and no ether linkage. Such type of reactant may be employed in the present instance, if desired. Regardless of what type of reactant is employed, the final product is invariably soluble in or produces a colloidal sol in dilute acetic acid or dilute mineral acid. Completeness of reaction can be checked in each instance in the manner previously indicated.

In the case of hydroxyacetic acid, one may use a distinctly higher temperature without volatilization of the acid than in the instances where caproic acid is employed. For instance, the esterification involving hydroxyacetic acid may employ a temperature as high as 215° C.

Many of the preceding examples will be found to be soluble in water, even in the absence of acid. Some of the products are soluble in or produce a turbid sol or suspension in gasoline or benzene.

Previous reference has been made to the use of the anhydride as an acylating agent instead of the free acid. Probably salt formation is eliminated until esterification begins with liberation of a molecule of acid for each molecule of anhydride added. The liberated acid acts, of course, as if it had been added at the beginning of the reaction, and additionally, presents a modification, in that water is not eliminated, unless esterification takes place by virtue of the free acid. If, however, the esterification reaction involves only the anhydride and no acid, water would not be liberated. Thus, the measurement of the condensed water, if any, under such circumstances, is not necessarily an index of esterification. Other procedure must be used, although unforturnately, no method of measurement is available which is relatively quick and absolutely satisfactory to a precise and quantitative degree. If a salt is formed, titration with caustic soda or potash converts the salt into the free base. The particular end point using the usual indicators is rather indefinite, and thus, the use of additional alkali to determine the saponification value results in a determination of somewhat approximate value, due to such difficulties of analytical manipulation. The values obtained, however, even though only approximate, are perfectly satisfactory for the present purposes. Other suitable procedure but more laborious, involves the saponification of the product, followed by acidification with a non-volatile mineral acid, e. g., sulfuric acid, and distillation of the low molal carboxy acids which were originally combined in ester form, followed by the usual volumetric procedure in correlation to the original sample.

The following reactions illustrate the formula of the high molal aminoalcohols and aminopolyglycols, and also their esterification products, without reference to the formation of the hydrated base or of a salt from the anhydro base. In the subsequent structural illustrations where R₁ appears, it is assumed, for convenience, that R₁, in such instance as illustrated, does not include a hydroxyl radical. Oxyalkylation, under such circumstances, must, of necessity, involve the amino hydrogen atom. Actually, it would not matter if the radical indicated by R₁ does contain a hydroxyl radical, for the reason that the linkage involving a hydrogen atom and an amino nitrogen atom, as contemplated in the herein described reactants, appears to be more susceptible to oxyalkylation than the hydrogen-oxygen linkage of the hydroxyl group. After the first mole of oxyalkylating agent is introduced into the amino hydrogen position, whether it be ethylene oxide or glycide, the resulting radical is the equivalent of R₁ in such instances where R₁ does contain an alcoholic hydroxyl group. It would not matter if the next mole of oxyalkylating agent attacked the hydroxyl of R₁ or the hydroxyl of the alcoholic group which replaced the amino hydrogen atom. Stated in another way, if R₁ is a hydroxylated radical, then R₂OH and R₁ would be the equivalent of each other, and R₃COOH in the resulting esterification reaction would combine as readily, in most instances, with the R₁ radical as with the R₂OH radical. One must not lose sight of the fact that esterification must involve a tertiary amine, and thus eliminate amidification as a possible reaction. If R₁ does contain an alcoholic hydroxyl and is reactive, and if the amine is the secondary amine, then in each instance the reaction must be conducted by the use of suitable quantities of an alkylating agent so as to eliminate the amino hydrogen atom.

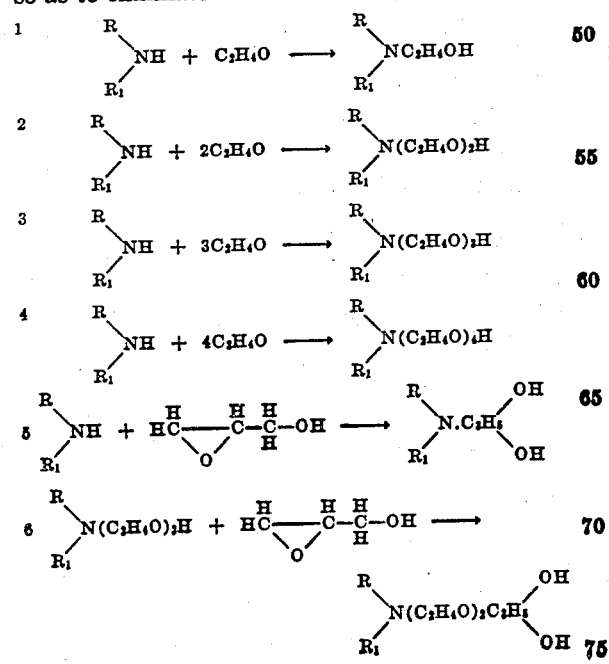
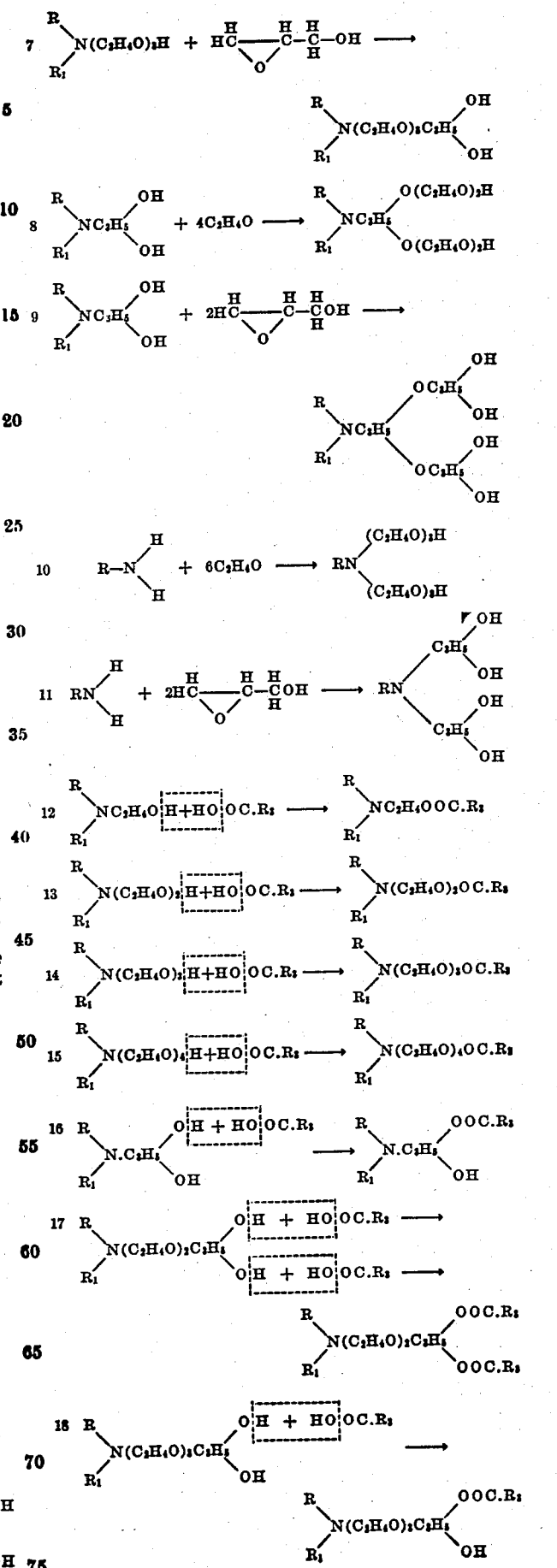

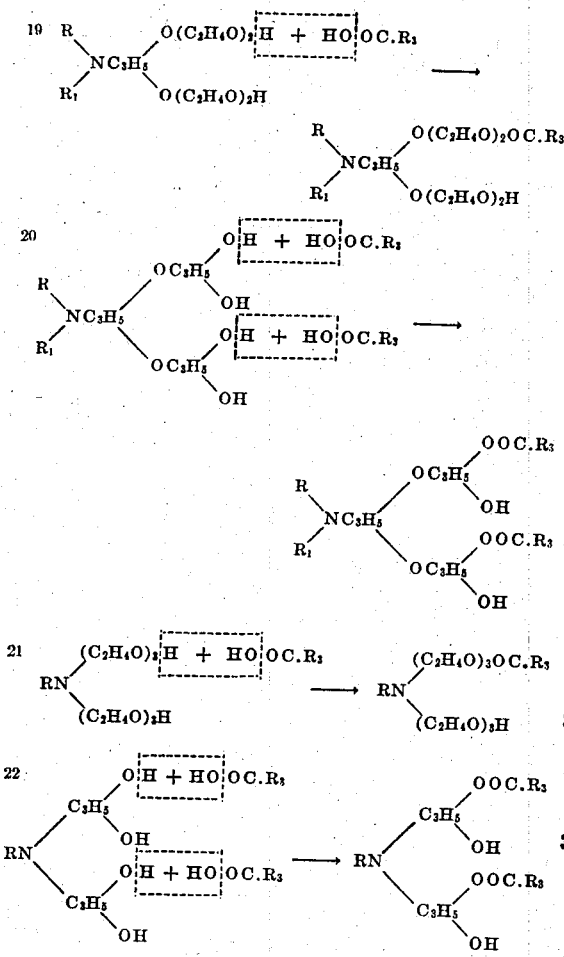

As will be noted, in such instances where butylene oxide replaces ethylene oxide, the number of carbon atoms in the polyglycol radical attached to the amino nitrogen N may be as high as 15.

In certain of the above formulae at first examination there does not appear to be available hydroxyl to act as an alcoholic compound in subsequent esterification reactions. However, it has been pointed out that the radical $R_3$ may contain an alcoholic hydroxyl radical, as in the case of lactic acid or hydroxyacetic acid, and similarly, one occurrence of R in such instances where there are two occurrences of R joined to an aminonitrogen atom may represent a hydroxyalkyl or polyhydroxyalkyl radical, including the type in which the carbon atom chain is interrupted by oxygen. This is illustrated by reference to the first four reactions by merely replacing the secondary amine $(R)_2NH$ by the primary amine $RN(H)_2$ by using an appropriate amount of oxyethylating agent to convert such primary amine into a secondary amine.

Summarizing what has been said thus far, it is to be noted that in essence it represents nothing more nor less than a description of a basic amino-alcohol of the formula:

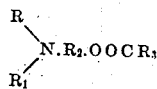

in which R is a monovalent radical free from ether linkages and having at least 8 carbon atoms and not more than 32 carbon atoms, and being a member of the class consisting of aliphatic hydrocarbon radicals, alicyclic hydrocarbon radicals, and aralkyl hydrocarbon radicals; $R_2$ is a divalent radical having less than 16 carbon atoms and not more than 3 ether linkages and being a member of the class consisting of alkylene radicals, hydroxyalkylene radicals, alkyleneoxy radicals, hydroxyalkyleneoxy radicals, polyglycol and hydroxy polyglycol radicals, in which any alkylene radicals present are selected from the group consisting of ethylene, propylene, butylene, and methylbutylene; and $R_1$ is a monovalent radical and a member of the class consisting of aliphatic hydrocarbon radicals, alicyclic hydrocarbon radicals and aralkyl hydrocarbon radicals having not more than 32 carbon atoms, and the monovalent radical $HOR_2$, wherein $R_2$ has its prior significance; $R_3CO$ is an acyl radical of a low molal monocarboxy acid having less than 8 carbon atoms; with the added proviso that at least one of the 3 radicals, $R_1$, $R_2$ and $R_3$ shall have present an alcoholic hydroxyl radical.

Previous reference has been made to the use of a polycarboxy reactant. Such intermediate reactants are readily available and are produced by reactions involving suitably selected fatty compounds or their equivalent with typical polybasic carboxy acids, such as phthalic acid, succinic acid, malic acid, fumaric acid, citric acid, maleic acid, adipic acid, tartaric acid, glutaric acid, diphenic acid, naphthalic acid, tricarballylic acid, etc. Instead of acids one may, of course, use any functional equivalent, particularly the anhydride. The anhydride, as a primary reactant, when available, is a particularly suitable reactant when two carboxyl reactants are attached to adjacent carbon atoms. The most suitable acids are maleic, citraconic and phthalic. They are conveniently used in the form of the anhydride. Acids having three or more carboxyl radicals may be used, but we prefer to use the dibasic carboxy acids. Hydroxylated polycarboxy acids may be employed, but we prefer to use the nonhydroxylated type, insofar that they are, generally speaking, more resistant to pyrolysis.

Another type of polybasic carboxy acid which may be employed, is the so-called adduct type. For instance, maleic anhydride or its equivalent is reacted with a number of well known types of reactants which contain conjugated double bonds and enter into the diene synthesis. The Diels-Alder adducts thus obtained represent suitable polybasic carboxy acids.

The somewhat similar adduct, in the sense that it involves the use of maleic anhydride or its equivalent, is the Clocker adduct. This is obtained from unsaturated acids, alcohols, or the like, which may have only one ethylene linkage, or is not conjugated in the event that more than one ethylene linkage is present. The adduct is obtained at a distinctly higher temperature than the Diels-Alder adduct and appears to be acyclic. Cyclobutane structures may also be involved. In the event that either type of adduct is obtained from a detergent-forming monocarboxy acid, particularly a higher fatty acid such as the fatty acids derived from China-wood oil or linseed oil, the product so obtained is not considered as a detergent-forming acid derivative, or a higher fatty acid derivative in the present instance.

It has been previously pointed out that the acylated amino-alcohols employed as reactants must have present a reactive alcoholic hydroxyl radical, and may have present more than one such hydroxyl radical, and two, three, or even more. In light of this fact, it is obvious that one may produce monomeric compounds comparable to dibutyl phthalate or linear polymers free from cross-linking as obtainable from ethylene glycol and phthalic anhydride, or else compounds in which cross-linking can take place to a greater or lesser degree, comparable to those obtainable from glycerol and phthalic anhydride. In any event, the final products obtained by esterification, must represent monomeric compounds, or else, polymeric compounds comparable to an "A" stage, or "B" stage resin, i. e., either they must be still fusible or soluble in selected solvents, or both. They must not represent the insoluble, infusible "C" stage resin.

Esterifications of this type are used so generally that further description appears unnecessary. The alcoholic reactant, i. e., the aminoglycol, is usually a fairly viscous or semi-solid material per se. Reaction with polybasic carboxy acid derivatives, as described, produces substances which may be viscous liquids, balsams, or hard solids, but in any event, they are sub-resinous in the sense that they have not reached what is commonly termed the "C" stage.

Esterification reactions, of course, are conducted in such a manner that an active carboxyl group, or its equivalent, is present as an available active hydroxyl group. The reactions may be, and frequently are, catalyzed by the addition of a small amount of free acid, such as dry hydrochloric acid, a few percent or less of an aromatic sulfonic acid such as paratoluene sulfonic acid. The temperature employed is above the boiling point of water, for instance, 160° to 180° C., or even higher, provided there is no pyrolysis. The reaction goes to completion by virtue of the fact that water of esterification, or its equivalent, is removed. Such water may be removed in any suitable manner, such as the passage of dry nitrogen gas, or by the use of an inert solvent such as xylene or decalin. The progress of the reaction can be checked by determination of the amount of free acid present.

Since the herein described compositions of matter and particularly those employed as a demulsifying agent, are obtained by esterification reactions involving an acidic fractional ester, as previously described, and since such fractional ester in turn is derived by esterification reactions between (I) compounds containing a detergent-forming monocarboxy acid and (II) a polybasic carboxy acid, it is necessary that either (I) or (II) contain an alcoholic hydroxyl group. Such alcoholic hydroxyls are present in some detergent-forming acid molecules, and when such acids are employed, they may be esterified directly by the polybasic acid. Obviously, the esters, salts, and other derivatives of such acids which leave the hydroxyl part of the acyl group intact, may also be employed. Examples of suitable hydroxy detergent-forming acids or their functional equivalents are: Hydroxystearic acid, ricinoleic acid, trihydroxypalmitic acid, hydroxynaphthenic acid, tridihydroxystearin, triricinolein, butyl ricinoleate, ethyl dihydroxystearate, ethylene glycol diricinoleate, etc. Hydroxylated polybasic carboxy acids may react with any high molal acids.

In some cases it is desirable to form a partial ester of these hydroxy detergent-forming acids with a polyhydric alcohol to yield a compound having more than one hydroxyl group available for reaction with the polybasic acid. Examples of such esters are: Glyceryl monoricinoleate, glyceryl diricinoleate, ethylene glycol monodihydroxystearate, diethylene glycol monohydroxystearate, sorbitol di-dihydroxystearate, etc.

In addition to the common higher fatty acids and other detergent-forming acids described above, the present invention is intended to include, for the manufacture of the intermediates, the use of fatty acids and partial esters of fatty acids obtained by the drastic oxidation of non-drying and semi-drying oils, such as castor oil, sunflowerseed oil, cottonseed oil, rapeseed oil, soyabean oil, etc. Acids and esters prepared from such blown or drastically-oxidized oils are regular articles of commerce obtainable on the market. Other detergent-forming acids suitable for preparing the present demulsifying agents may be prepared by blowing or oxidizing unsaturated fatty acids, such as castor oil fatty acids, soyabean fatty acids, oleic acid and the like.

When the detergent-forming acid itself does not contain an alcoholic group, it may be reacted with a polyhydric alcohol to yield a partial ester having one or more residual hydroxyls available for esterification with a polybasic acid. Note what has been said in regard to reaction with hydroxylated polycarboxy acids.

Conversely, the polybasic acid used may first be esterified with the polyhydric alcohol to yield esters having unreacted hydroxy groups available for esterification of the detergent-forming acid. If the detergent-forming material does not contain an alcoholic hydroxyl radical, we have found that the reaction is usually easier to control, in order to obtain the desired final products, if the polyhydric alcohol intended to be used is first reacted with the detergent-forming acid and the fractional ester so obtained subsequently reacted with the polybasic acid.

Examples of polyhydric alcohols which may be employed to bring about ester formation between detergent-forming acids and polybasic acids are: Glycerol, diglycerol, alpha-beta, gamma butanetriol, beta methyl glycerol, ethylene glycol, diethylene glycol, triethylene glycol, 1,3-propene diol, isobutylene glycol, ethylene glycol gycerol ether, diglycerol monoethylene glycol ether, mannitol, sorbitol, sorbitan, mannitan, sorbitol monobutyl ether, erythritol, adonitol, dihydroxy thiophene, etc.

For the purpose of this invention, polyhydroxy amines are considered the functional equivalents of polyhydroxy alcohols. Examples of such compounds are: Monoglycerylamine, triethanolamine, diethanolamine, phenyldiethanolamine, dicyclohexanolamine, cyclohexylpropanolamine, benzyldiethanolamine, pentanolamine, diethanolmethylamine, tripropanolamine, etc. Ethers derived from this class of compounds or in combination with the previously mentioned diols, triols, etc., are included.

It should be pointed out that the hydroxy esters conveniently employed for reaction with polybasic acids to form the intermediates of the present invention, need not necessarily be prepared by reacting the detergent-forming acid with the polyhydric alcohol directly. In many instances, it is more convenient to prepare these hydroxy esters by re-esterification of fats, oils, drastically-oxidized oils, or detergent-forming acid esters with polyhydric alcohols. For example, a fat such as stearin may be re-esterified with glycerine to form glycerol monostearate, which may be subsequently reacted with a polybasic acid. The preparation of such fractional esters derived from fats, oils, and drastically-oxidized oils, is well known, and the products are sold commercially under various names. Similar products may be obtained by re-esterification of the oils, fats, drastically-oxidized oils, and detergent-forming acid esters with other polyhydric alcohols, such as glycols, sorbitol, mannitol, polyhydroxyamines, or other polyhydric alcohols; and such products may be conveniently employed for the manufacture of the demulsifying agents of the present process. Analogous partial esters are obtained from rosin acid, naphthenic acid, and the like.

Often it is convenient to perform the re-esterification simultaneously with the esterification of the polybasic acid. For example, a mixture of a fatty oil, a polyhydric alcohol, and a polybasic acid may be mixed and heated together to yield an intermediate. If a hydroxylated oil, such as, for example, triricinolein, is employed, then one need not add a polyhydric alcohol unless desired.

The formation of one kind of intermediate contemplated for use according to our invention, may be exemplified by the esterification reaction between a polybasic acid and ricinoleic acid. In this case the detergent-forming acid compound contains a single hydroxyl group, and the reaction obviously will yield a simple ester containing a residual carboxylic acid group, but no residual hydroxyl groups.

The formation of a second type of product may be exemplified by the reaction between ethylene glycol monostearate and a polybasic acid. In this case, as well, the result of reaction is a simple ester containing one or more residual carboxyl groups.

Our preferred reactants of the acidic fractional ester type are derived from castor oil and phthalic anhydride. Such compositions per se are old. For instance, see U. S. Patent No. 2,166,432, dated July 18, 1939, to De Groote, page 4, from the heading "Intermediate amine, Example 9," to page 5, heading "Composition of matter, Example 1." See U. S. Patent No. 2,166,433, dated July 18, 1939, to De Groote, page 4, from the heading "Intermediate amine, Example 8," to page 7, heading "Composition of matter, Example 1."

If triricinolein be indicated by the following formula:

(A)
```
OH.R.COO.CH₂
OH.R.COO.CH
OH.R.COO.CH₂
``` then reaction products of phthalic anhydride or phthalic acid may be indicated in the following manner, although, for purposes of convenience, phthalic acid is not shown in the form of the usual isomer, where, of course, the two carboxyl radicals are attached to adjacent carbon atoms:

(B) 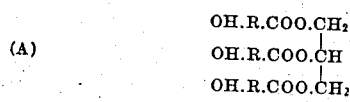
```
COO.R.COO.CH₂
OH.R.COO.CH
OH.R.COO.CH₂
```

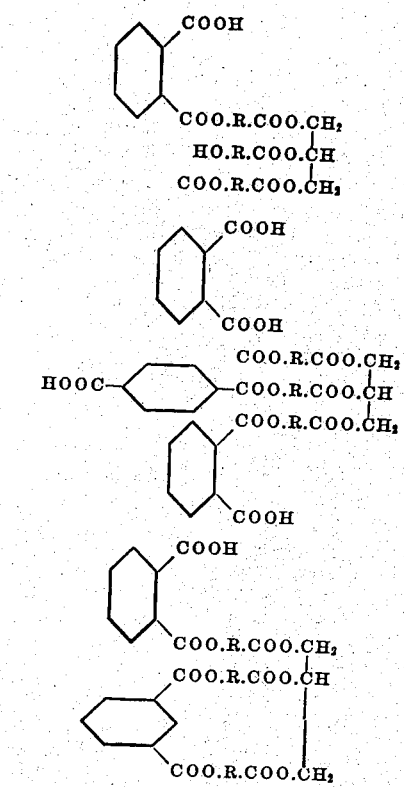

(E) 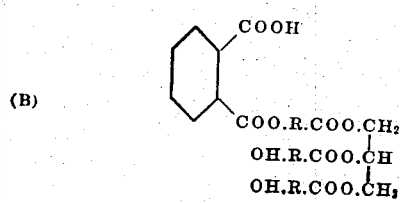

A large number of related products immediately present themselves, for instance, esters derived by reaction with ricinoleic acid, hydroxystearic acid, dihydroxystearic acid, and the like; or the corresponding esters derived from glycols or glycol ethers, such as ethylene glycol or diethylene glycol, which contain no free hydroxyl radicals attached to the glycol radical or residue. Similarly, one might have products derived from monohydric alcohols, for instance, ethyl ricinoleate, propyl ricinoleate, sodium ricinoleate, amylamine hydroxystearate, etc. It is intended to include blown oils.

In the examples shown above, where the ester is polybasic, for instance, compounds of the type exemplified by C and D, above, one might remove the acidity of one of the carboxylic hydrogen atoms, or two of the carboxylic hydrogen atoms, in any feasible manner, i. e., by neutralization with an alkali, or by conversion into an ester involving reaction with a new kind of an alcohol, i. e., a monohydric, dihydric, trihydric, etc.

In the case of D, above, two carboxylic hydrogens may be neutralized. In any event, however, the material derived by reaction between a polybasic acid and its functional equivalent and a hydroxylated fatty material of the kind described, is characterized by the presence of at least one free carboxyl radical.

Where reference is made to ricinoleic acid, hydroxystearic acid, dihydroxystearic acid, a hydroxy fatty acid, and the like, it is evident that certain simple derivatives, such as the halogenated compounds, etc. are the obvious functional equivalents; for instance, chlorinated triricinolein, may be employed instead of triricinolein. Brominated ricinolein acid might be employed instead of triricinolein. Brominated ricinoleic acid might be employed instead of ricinoleic acid. In these instances the hydroxylated fatty material, notwithstanding modifications of the kind indicated, still has the same functional properties as the unmodified hydroxylated fatty material, and thus acts in the same manner, as far as producing an effective demulsifying agent is concerned. In the hereto appended claims reference to a hydroxylated fatty material includes such obvious functional equivalents.

The second of the aforementioned De Groote patents describes such materials as diphthalated diricinolein, dimaleated monostearin, dioxalated monoabietin, dicitrated mononaphthenin, etc.

In such instances where phthalic anhydride or the like is reacted with ricinoleic acid, hydroxystearic acid, etc., to form a fractional ester, such fractional ester is reacted further with the hydroxylated amino-alcohol without limitation as to whether the carboxyl group of the phthalic acid radical or the carboxyl group of the higher fatty acid radical is involved.

Although the compounds or compositions of matter herein described may be obtained in any suitable manner, it is obvious that having obtained a hydroxylated amino-alcohol of the kind described, all that one need to do is to react such compound with the acidic fractional ester of the kind previously described, in order to produce compositions of the kind herein contemplated. Such reactions are illustrated by the following examples:

COMPOSITION OF MATTER

*Example 1*

1 pound mole of a material of the kind exemplified by "Hydroxylated monocarboxy ester of high molal amino-polyglycol, Example 1," is esterified with 1 pound mole of the dibasic ester obtained by reacting 1 mole of castor oil with 2 moles of phthalic anhydride. Such product is essentially triricinolein di-acid phthalate. The reaction is conducted at 165° to 195° C. for 2 to 6½ hours, until analysis shows that one carboxyl has been eliminated by esterification. The reaction is a conventional esterification reaction and can be conducted in the presence of an inert solvent, such as xylene or decalin, which removes the water in a slow manner. The method of conducting such esterification reactions is the same as has been previously described in detail. The product obtained is a thick, viscous, subresinous, deep amber-colored mass.

COMPOSITION OF MATTER

*Example 2*

The same procedure is followed as in Example 1, immediately preceding, except that triricinolein tri-acid-phthalate obtained by reacting 1 mole of castor oil with 3 moles of phthalic anhydride, is employed instead of triricinolein di-acid phthalate.

COMPOSITION OF MATTER

*Example 3*

The same procedure is employed as in the preceding example, except that the time of reaction is increased somewhat and temperature of reaction increased somewhat, for example, up to 200° C., and as long as 6 to 8 hours, to insure elimination of one-half to two-thirds of the acid value, due to the phthalic anhydride carboxyls.

COMPOSITION OF MATTER

*Example 4*

The same procedure is employed as in preceding Examples 1 to 3, inclusive, except that materials of the kind exemplified by "Hydroxylated monocarboxy ester of high molal amino-polyglycol, Examples 2 to 5, inclusive," are substituted in place of the material described under the heading "Hydroxylated monocarboxy ester of high molal amino-polyglycol, Example 1."

COMPOSITION OF MATTER

*Example 5*

The same procedure is employed, as in Examples 1 to 4, immediately preceding, except that the superglycerinated fat or fractional ester obtained by reaction between 1 mole of acyclic diglycerol and 1 mole of oleic acid is reacted with 2 moles or 3 moles of phthalic anhydride to give a di-acid phthalate or tri-acid phthalate, and such acid phthalate are used in the same manner as the acid phthalates derived from castor oil.

COMPOSITION OF MATTER

*Example 6*

The same procedure is followed as in Examples 1 to 5, immediately preceding, except that an analogous maleic anhydride, adipic acid, citraconic anhydride, succinic acid, or some other polybasic acid, particularly a dibasic acid, is substituted for phthalic anhydride derivatives in the preceding examples.

In order to illustrate derivatives obtained by reaction between a polybasic carboxy acid fractional ester, and more especially, a dibasic carboxy acid fractional ester and an esterified amino-alcohol of the kind described, the following formulae, along with indicated reactions, are included. Previous reference has been made to $R_3.COOH$, being a low molal monocarboxy acid. In some instances, such acid might contain an alcoholic hydroxyl group, as in the case of lactic acid, hydroxyacetic acid, etc. For convenience in the formulae appearing immediately hereafter $OHR'_3.COOH$ is intended to refer specifically to the low molal monocarboxy acid having an alcoholic hydroxyl radical.

Previous reference has been made to various types of fractional esters containing groups derived from polybasic carboxy acids, and particularly, dicarboxy acids. If a compound such as monostearin is reacted with two moles of phthalic anhydride, the resultant fractional ester is, in reality, the equivalent of the dibasic acid. The same applies to the dibasic reaction product obtained from 1 mole of triricinolein and 2 moles of phthalic anhydride. A similar reaction product derived from 3 moles of phthalic anhydride, would represent a tribasic acid. The same is true of a product derived from 3 moles of phthalic anhydride and 1 mole of monoricinolein.

For convenience, the formulae are limited to the dicarboxy type $HOOC.R_4.COOH$, in which $R_4$ may be considered the nucleus or radical derived from triricinolein diphthalate or monostearin diphthalate. The formulae are based on reactions involving equimolar quantities, except in the last two instances, where 2 moles of the dicarboxy fractional ester are used for each mole of dihydric amino-alcohol.

In examining the structural formulae immediately following, attention is directed as to what has been said previously in regard to the esterification of the amino-alcoholic body with a monocarboxy acid when $R_1$ did contain a hydroxyl radical. An analogous situation applies in the instant case, where the hydroxylated monocarboxy acid ester is subjected to reaction of a polycarboxy acid or derivative. It appears unnecessary to repeat what has been said, except to point out that isomers or more complex structures may be involved when $R_1$ contains one or more alcoholic hydroxyl radicals.

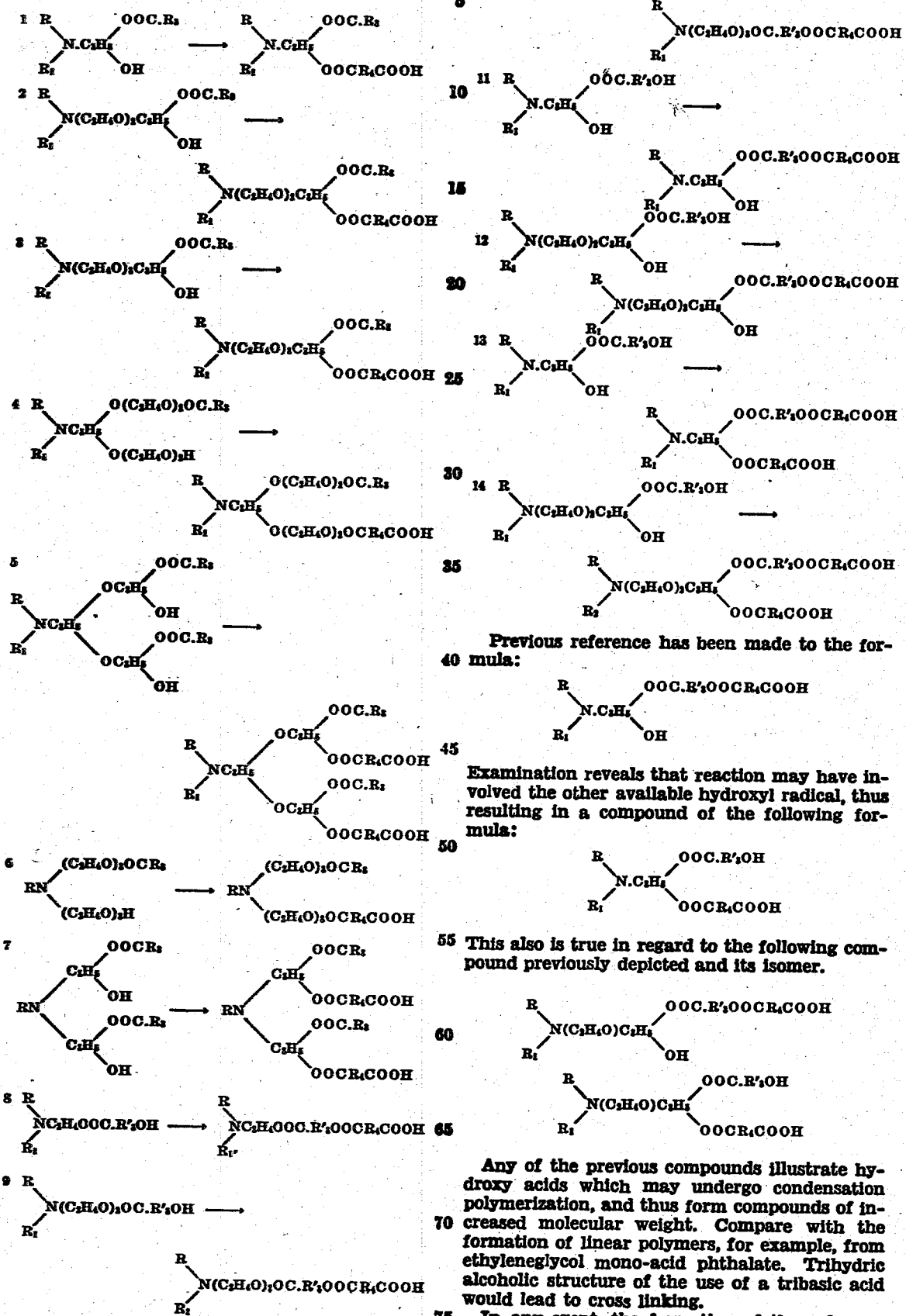

Previous reference has been made to the formula:

Examination reveals that reaction may have involved the other available hydroxyl radical, thus resulting in a compound of the following formula:

This also is true in regard to the following compound previously depicted and its isomer.

Any of the previous compounds illustrate hydroxy acids which may undergo condensation polymerization, and thus form compounds of increased molecular weight. Compare with the formation of linear polymers, for example, from ethyleneglycol mono-acid phthalate. Trihydric alcoholic structure of the use of a tribasic acid would lead to cross linking.

In any event, the formation of the polymers may be indicated as a derivative of the prior compound of the formula:

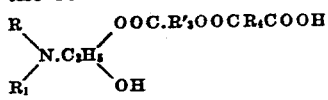

in the following manner:

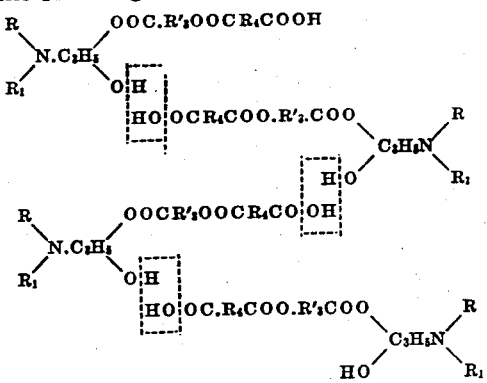

In the above presentation re-esterification has been ignored.

The esterified hydroxylated amino-glycol of the kind previously described, must contain at least one, and preferably more than one, alcoholic hydroxyl radical. Such reactant may be considered for the sake of simplicity as being in the class of an alcohol, i. e., a monohydric or polyhydric alcohol. If an alcohol is indicated by the formula $Y'(OH)_n$, where $n$ indicates the number 1 or more, and if a polybasic acid body be indicated by the formula $X'(COOH)_{n'}$ where $n$ indicates the number 2 or more, then the reaction between a monohydric alcohol and a polybasic acid will result in a compound which may be indicated by the following formula: $YX(COOH)_{n'}$ where $n'$ indicates the number 1 or more, and which is, in reality, a contraction of a more elaborate structural formula, in which $X'$ and $Y'$ are joined by a carboxyl radical or residue. Assuming, however, as would be true in the majority of cases, that the alcohol actually would be a polyhydric alcohol, and that the acid body would be polybasic in nature, for instance, if one employed a diphthalate or triphthalate, then examination reveals that the formulae might result in a combination, in which there were neither residual carboxyl radicals, nor residual hydroxyl radicals, or might result in compounds in which there were residual hydroxyl radicals, and no residual carboxyl radicals, or compounds where there might be residual carboxyl radicals and no residual hydroxyl radicals, or there might be both. This is indicated by the following:

$$(Y.X)_q(OH)_{n'}$$
$$(Y.X)_q(COOH)_{m'}$$
$$(OH)_{n''}(YX)_q(COOH)_{m''}$$

in which $q$ indicates a small whole number (one in the case of a monomer, and probably not over 20, and usually less than 10), and $m'$ and $n'$ indicate the number 1 or more, and $m''$ and $n''$ indicate zero or a small or moderately-sized whole number, such as zero, 1 or more, but in any event, probably a number not in excess of 40. Naturally, each residual hydroxyl could combine with a phthalic acid radical or its equivalent, or with a tribasic acid radical, such as one derived from citric acid; and in such event, there would be a large number of free or uncombined carboxyl radicals present, possibly 1 to 20, or more. Actually, the preferable type of reagent would be more apt to include less than 10, and in fact, less than 5 free hydroxyl radicals. It is not necessary to remark that the residual carboxyl radicals can be neutralized in any suitable manner, such as conversion into salts, esters, amides, amino esters, or any other suitable form. Usually, such conversion into salt form would be by means of sodium hydroxide, potassium hydroxide, calcium hydroxide, magnesium hydroxide, ammonium hydroxide, amylamine, butanolamine, ethanolamine, diethanolamine, triethanolamine, cyclohexylolamine, benzylamine, aniline, toluidine, etc. Conversion into the ester would be by means of a monohydric alcohol, such as methyl alcohol, ethyl alcohol, propyl alcohol, butyl alcohol, hexyl alcohol, octyl alcohol, decyl alcohol, ethylene glycol, diethylene glycol, glycerol, diglycerol, triethylene glycol, or the like. One could employ an amino alcohol so as to produce an ester.

If a tricarboxy acid derivative such as one derived from citric acid, is employed, then at least theoretically, two moles of the esterified amino-glycol derivative might react with 1 mole of the citric acid compound. Similarly, as has already been pointed out, a large number of molecules of a polybasic acid compound might combine with a single molecule of a highly hydroxylated aminoalcohol derivative. For practical purposes, however, we have found that the most desirable products are obtained by combinations, in which the ratio of aminoalcohol derivative to the polybasic acid is within the ratio of 3 to 1 and 1 to 5, and in which the molecular weight of the resultant product does not exceed 10,000, and is usually less than 5,000, or preferably, less than 3,000. This is particularly true, if the resultant product is soluble to a fairly definite extent, for instance, at least 5%, in some solvent, such as water, alcohol, benzene, dichlorethyl ether, acetone, cresylic acid, or the like. This is simply another way of stating that it is preferable, if the product be one of the sub-resins, which are commonly referred to as an A resin, or a B resin, as distinguished from a C resin, which is a highly infusible, insoluble resin (see Ellis Chemistry of Synthetic Resins, 1935, page 862 et seq.).

In recapitulating what has been said previously, the sub-resinous, semi-resinous, or resinous product herein contemplated may be indicated by the following formula:

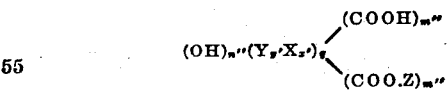

in which the characters have their previous significance, and $y'$ represents a small whole number not greater than 3, and $x'$ represents a small whole number not greater than 5; Z represents a hydrogen ion equivalent, such as a metallic atom, organic radical, etc.

Reference to an amine and amino compound is intended to include the salts and the anhydro base, as well as the hydrated base, since both obviously are present when a water-containing emulsion is treated with an amine or amino compound.

"In an aqueous solution of the amine the anhydro base, $R-NH_2$, the hydrated base, $R-NH_3OH$, and the two ions are all present." (Richter, v. s. page 252.)

In the hereto appended claims reference to radicals derived from olefine oxides, is intended to include glycide. In other words, in the case of propylene oxide, it is intended that hydroxy propylene oxide be included.

Materials of the kind herein contemplated are useful as wetting, detergent, and leveling agents in the laundry, textile, and dyeing industry; as wetting agents and detergents in the acid washing of fruit, in the acid washing of building stone and brick; as a wetting agent and spreader in the application of asphalt in road building and the like; as a constituent of soldering flux preparations; as a flotation reagent in the flotation separation of various minerals; for flocculation and coagulation of various aqueous suspensions containing negatively charged particles, such as sewage, coal washing waste water, and various trade wastes, and the like; as germicides, insecticides, emulsifiers for cosmetics, spray oils, water-repellent textile finish, etc. These uses are by no means exhaustive. The most important phase of the present invention, as far as industrial application goes, is concerned with the use of the materials previously described as demulsifiers for water-in-oil emulsions, and more specifically, emulsions of water or brine in crude petroleum.

We have found that the chemical compounds herein described, which are particularly desirable for use as demulsifiers, may also be used as a break inducer in doctor treatment of the kind intended to sweeten gasoline. (See U. S. Patent No. 2,157,223, dated May 9, 1939, to Sutton.)

Chemical compounds of the kind herein described are also of value as surface tension depressants in the acidization of calcareous oil-bearing strata by means of strong mineral acid, such as hydrochloric acid. Similarly, some members are effective as surface tension depressants or wetting agents in the flooding of exhausted oil-bearing strata.

As to using compounds of the kind herein described as flooding agents for recovering oil from subterranean strata, reference is made to the procedure described in detail in U. S. Patent No. 2,226,119, dated December 24, 1940, to De Groote and Keiser. As to using compounds of the kind herein described as demulsifiers, or in particular as surface tension depressants, in combination with mineral acid or acidization of oil-bearing strata, reference is made to U. S. Patent No. 2,233,383, dated February 25, 1941, to De Groote and Keiser.

The new compounds herein described are of utility, not only for the purposes specifically enumerated in detail, but also find application in various other industries, processes, and for various uses where wetting agents of the conventional type are used. As to some of such additional uses which are well known, see "The Expanding Application of Wetting Agents," Chemical Industries, volume 48, page 324 (1941).

Since the herein contemplated products are esters, it is hardly necessary to point out that saponification decomposes the product into its original components, to wit, an amine and an acid or acids. Actually, the acids are obtained in the form of salts, usually the sodium or potassium salts. Such conversion into the original components or simple modifications thereof results in products which can be examined in the customary manner, and thus serve to identify the esterified amino radical.

Having thus described our invention, what we claim as new and desire to secure by Letters Patent is:

1. A sub-resinous esterification product of the formula:

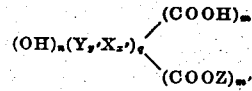

in which X is a polycarboxy acid fractional ester radical having (a) an unreacted carboxyl radical; and (b) a detergent-forming monocarboxy acid radical having at least 8 and not more than 32 carbon atoms; said detergent-forming acid radical being an integral part of a detergent-forming acid compound of the class consisting of acids, monohydric alcohol esters and polyhydric alcohol esters, and $y'$ represents a whole number from 1 to 3, and $x'$ represents a whole number from 1 to 5, and $n$, $m$ and $m'$ represent whole numbers from 0 to 40; $q$ represents a whole number from 1 to 20; $z$ is a hydrogen ion equivalent; Y is the radical of a basic esterified amino-alcohol of the formula:

in which R is a monovalent radical free from either linkage and having at least 8 carbon atoms and not more than 32 carbon atoms and being a member of the class consisting of aliphatic hydrocarbon radicals, alicyclic hydrocarbon radicals, and aralkyl hydrocarbon radicals; $R_2$ is a divalent radical having less than 16 carbon atoms and not more than 3 ether linkages and being a member of the class consisting of alkylene radicals, hydroxyalkylene radicals, alkyleneoxy radicals, hydroxyalkyleneoxy radicals, polyglycol and hydroxypolyglycol radicals in which any alkylene radicals present are selected from the group consisting of ethylene, propylene, butylene, and methylbutylene; and $R_1$ is a monovalent radical and a member of the class consisting of aliphatic hydrocarbon radicals, alicyclic hydrocarbon radicals, and aralkyl hydrocarbon radicals having not more than 32 carbon atoms and the radical $HOR_2$, wherein $R_2$ has its prior significance; $R_3CO$ is an acyl radical of a low molal monocarboxy acid having less than 8 carbon atoms; with the added proviso that at least one of the 3 radicals, $R_1$, $R_2$ and $R_3$ shall have present an alcoholic hydroxyl radical.

2. The product of claim 1, wherein the polybasic acid radicals are limited to the dicarboxy species.

3. The product of claim 1, wherein the polybasic acid radicals are limited to the dicarboxy species, and in which there is at least one alcoholic hydroxyl radical present as part of the radical $R_1$.

4. The product of claim 1, wherein the polybasic carboxy acid is phthalic acid and in which there is at least one alcoholic hydroxyl radical present as part of the radical $R_1$.

5. The product of claim 1, wherein the polybasic carboxy acid is maleic acid and in which there is at least one alcoholic hydroxyl radical present as part of the radical $R_1$.

6. The product of claim 1, wherein the polybasic carboxy acid is citraconic acid and in which there is at least one alcoholic hydroxyl radical present as part of the radical $R_1$.

MELVIN DE GROOTE.
BERNHARD KEISER.